(12) United States Patent
Kalluri

(10) Patent No.: US 11,507,747 B2
(45) Date of Patent: Nov. 22, 2022

(54) HYBRID IN-DOMAIN AND OUT-OF-DOMAIN DOCUMENT PROCESSING FOR NON-VOCABULARY TOKENS OF ELECTRONIC DOCUMENTS

(71) Applicant: Oracle International Corporation, Redwood Shores, CA (US)

(72) Inventor: Sudhakar Kalluri, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 16/698,857

(22) Filed: Nov. 27, 2019

(65) Prior Publication Data

US 2021/0158210 A1 May 27, 2021

(51) Int. Cl.

| G06F 40/284 | (2020.01) |
| G06N 20/00 | (2019.01) |
| G06F 16/33 | (2019.01) |
| G06F 40/30 | (2020.01) |
| G06N 20/10 | (2019.01) |
| G06F 16/35 | (2019.01) |

(52) U.S. Cl.
CPC ........ *G06F 40/284* (2020.01); *G06F 16/3347* (2019.01); *G06F 16/355* (2019.01); *G06F 40/30* (2020.01); *G06N 20/00* (2019.01); *G06N 20/10* (2019.01)

(58) Field of Classification Search
None
See application file for complete search history.

(56) References Cited

U.S. PATENT DOCUMENTS

| 9,037,464 | B1* | 5/2015 | Mikolov | G06F 40/30 |
| | | | | 704/255 |
| 9,483,740 | B1* | 11/2016 | Ansel | G06F 40/284 |
| 10,380,498 | B1 | 8/2019 | Chaoji et al. | |
| 11,222,031 | B1* | 1/2022 | Mohandas | G06F 40/30 |
| 2003/0074368 | A1 | 4/2003 | Schuetze et al. | |
| 2006/0253273 | A1* | 11/2006 | Feldman | G06F 40/216 |
| | | | | 704/9 |

(Continued)

OTHER PUBLICATIONS

Saputra, Dimas Gilang, and Masayu Leylia Khodray. "An ensemble approach to handle out of vocabulary in multilabel document classification." 2016 International Conference On Advanced Informatics: Concepts, Theory And Application (ICAICTA). IEEE, 2016. (Year: 2016).*

(Continued)

*Primary Examiner* — Douglas Godbold
(74) *Attorney, Agent, or Firm* — Invoke

(57) ABSTRACT

Techniques are described herein for training and evaluating machine learning (ML) models for document processing computing applications based on in-domain and out-of-domain characteristics. In some embodiments, an ML system is configured to form feature vectors by mapping unknown tokens to known tokens within a domain based, at least in part, on out-of-domain characteristics. In other embodiments, the ML system is configured to map the unknown tokens to an aggregate vector representation based on the out-of-domain characteristics. The ML system may use the feature vectors to train ML models and/or estimate unknown labels for the new documents.

20 Claims, 9 Drawing Sheets

(56) References Cited

U.S. PATENT DOCUMENTS

| | | | |
|---|---|---|---|
| 2014/0365207 A1* | 12/2014 | Convertino | G06F 40/279 704/9 |
| 2015/0178268 A1* | 6/2015 | Zuev | G06F 40/30 704/9 |
| 2015/0178269 A1* | 6/2015 | Zuev | G06F 40/45 704/9 |
| 2017/0250931 A1 | 8/2017 | Ioannou et al. | |
| 2018/0114142 A1 | 4/2018 | Mueller | |
| 2018/0173696 A1* | 6/2018 | Hosabettu | G06F 16/36 |
| 2019/0080627 A1* | 3/2019 | Dey | G09B 19/00 |
| 2019/0349399 A1 | 11/2019 | Liu et al. | |
| 2019/0377785 A1* | 12/2019 | N | G06F 40/20 |
| 2020/0026755 A1* | 1/2020 | Hewitt | G06N 20/00 |
| 2020/0167429 A1* | 5/2020 | Katz | G06F 17/10 |
| 2020/0401658 A1* | 12/2020 | Katz | G06F 40/216 |
| 2021/0056164 A1 | 2/2021 | Mustafi | |

OTHER PUBLICATIONS

Kalra, Vandana, Indu Kashyap, and Harmeet Kaur. "Improving document classification using domain-specific vocabulary: hybridization of deep learning approach with TFIDF." International Journal of Information Technology (2022): 1-7. (Year: 2022).*

* cited by examiner

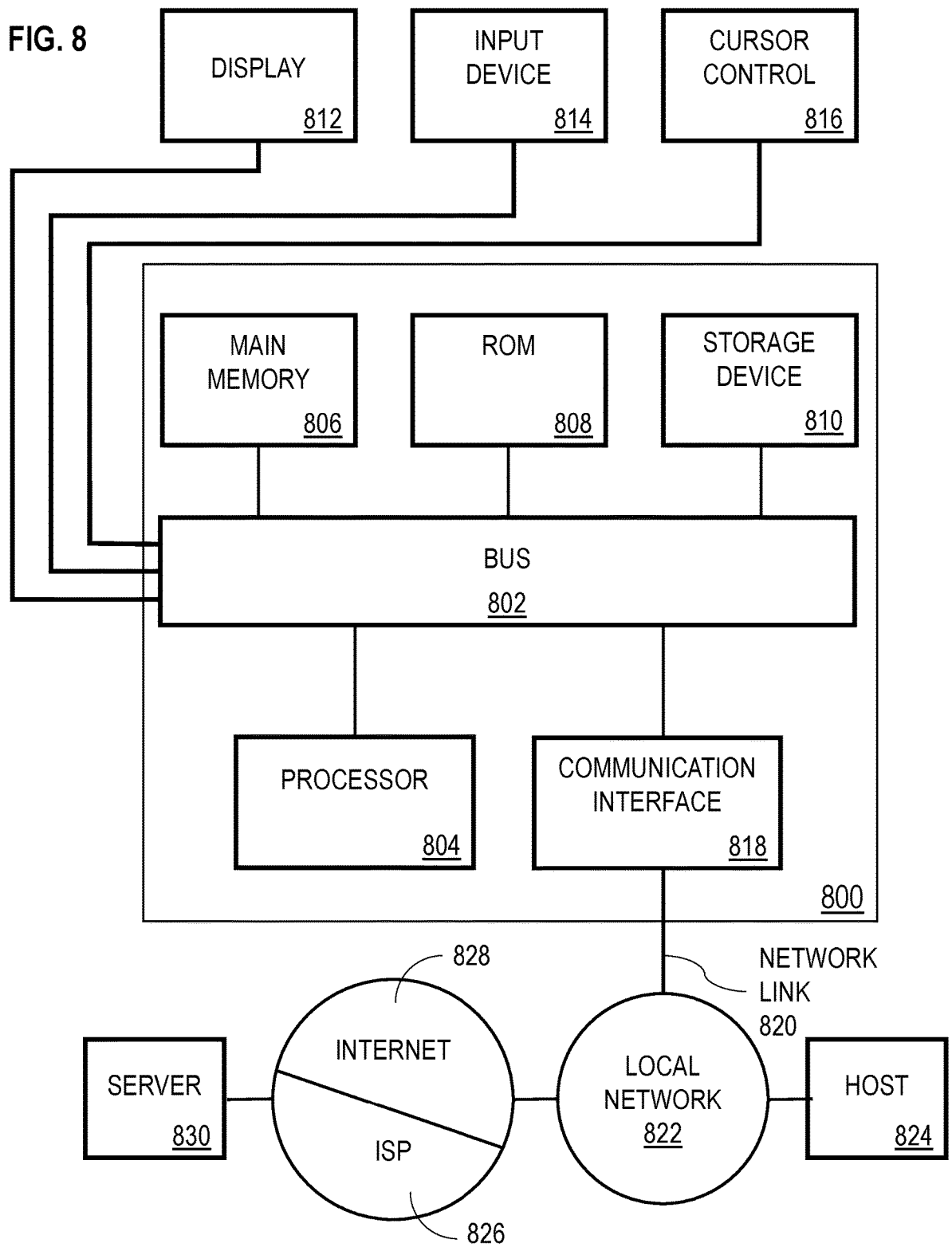

HYBRID IN-DOMAIN AND OUT-OF-DOMAIN DOCUMENT PROCESSING FOR NON-VOCABULARY TOKENS OF ELECTRONIC DOCUMENTS

RELATED APPLICATIONS; INCORPORATION BY REFERENCE

This application is related to U.S. application Ser. No. 16/524,440, filed Jul. 29, 2019, titled "SYSTEMS AND METHODS FOR OPTIMIZING MACHINE LEARNING MODELS BY SUMMARIZING LIST CHARACTERISTICS BASED ON MULTI-DIMENSIONAL FEATURE VECTORS"; and U.S. application Ser. No. 16/678,280, filed Nov. 8, 2019, titled "SYSTEMS AND METHODS FOR TRAINING AND EVALUATING MACHINE LEARNING MODELS USING GENERALIZED VOCABULARY TOKENS FOR DOCUMENT PROCESSING", the entire contents for each of which are hereby incorporated by reference.

TECHNICAL FIELD

The present disclosure relates to machine learning systems and applications. In particular, the present disclosure relates to training, tuning, and evaluating machine learning models based on vocabularies constructed from documents in a document corpus.

BACKGROUND

Machine learning involves techniques through which computing systems make inferences and adjustments during runtime rather than relying on static instruction sets to perform tasks. Machine learning has a wide range of applications, such as tuning search engine results, diagnosing medical conditions, recognizing images, recommending relevant items, forecasting resource utilization, responding to natural language inputs through virtual assistants, and improving autonomous driving vehicles, among several others.

In many applications, a training corpus of text documents is processed to develop a machine learning (ML) algorithm or model to be applied on a new document. For example, the corpus of documents may include Tweets, webpages, the subject-line and/or body of an email, and/or other electronic documents. An ML model may be developed to perform one or more functions, such as predicting the sentiment of a new Tweet as positive or negative (classification), categorizing a new news article added to a website (cluster assignment), and predicting the recipient response-rate to an email (estimation). The process of developing the ML model typically comprises fitting model parameters to learned patterns from the training corpus of documents. The process that is used to develop the ML model may impact various aspects of an application, such as the compute resources and processing time needed to train the ML model, the accuracy of the ML model, and the usability of an application with which the ML model is integrated.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 8 shows a block diagram that illustrates a computer system in accordance with one or more embodiments.

DETAILED DESCRIPTION

Figure 1:
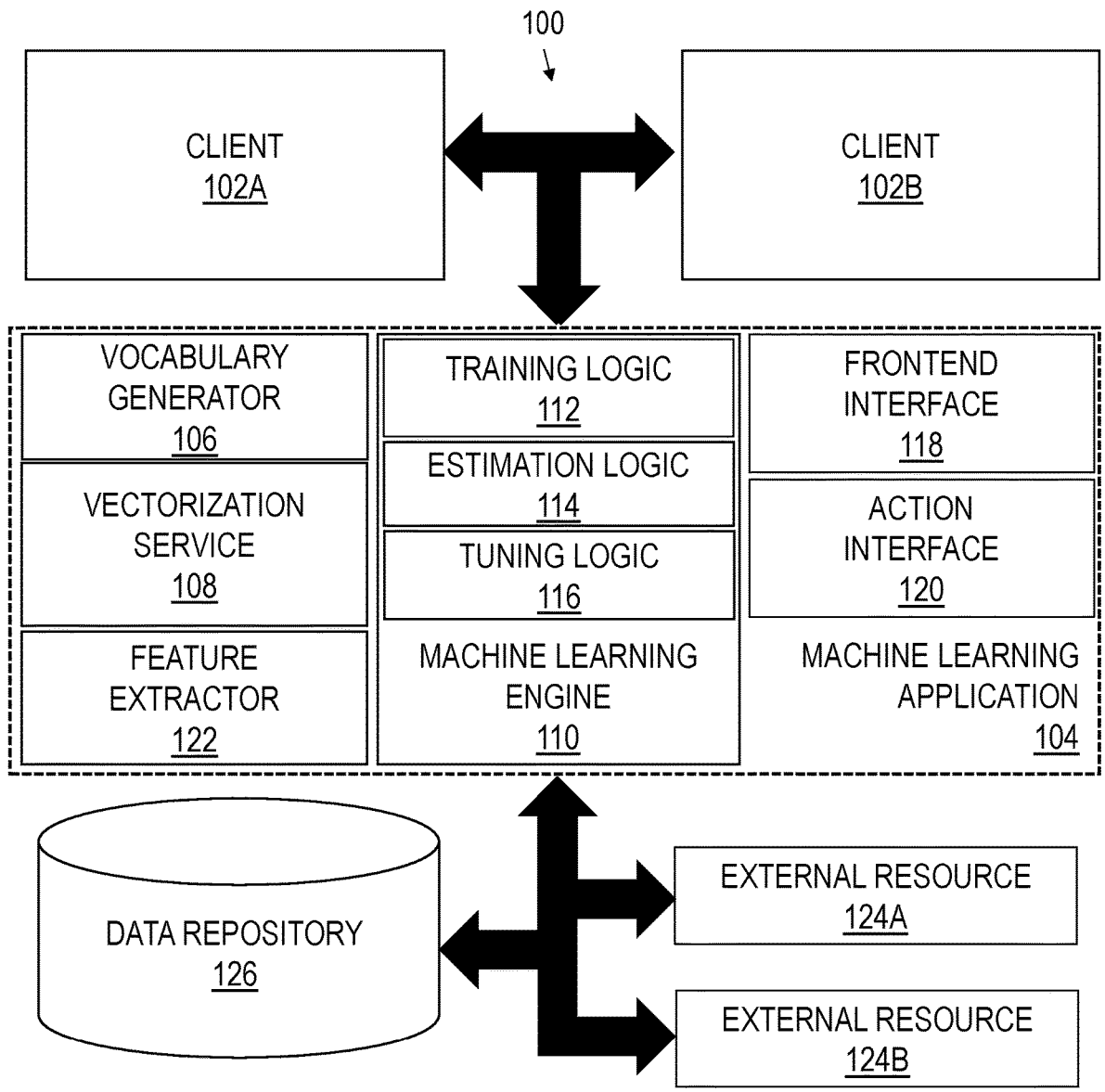
FIG. 1 illustrates an example system to perform hybrid in-domain and out of domain machine-learning applications in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 HYBRID IN-DOMAIN AND OUT-OF-DOMAIN DOCUMENT PROCESSING
   3.1 IN-DOMAIN VOCABULARY CONSTRUCTION
   3.2 IN-DOMAIN TOKEN WEIGHTING
   3.3 TOKEN REPLACEMENT BASED ON OUT-OF-DOMAIN CHARACTERISTICS
   3.4 COMPOSITE VECTOR FORMATION
4.0 MACHINE-LEARNING OPTIMIZATIONS AND APPLICATIONS
   4.1 PROCESS OVERVIEW: TOKEN REPLACEMENT
   4.2 PROCESS OVERVIEW: VECTOR AGGREGATION
   4.3 MODEL TRAINING
   4.4 MODEL PREDICTIONS
   4.5 MODEL TUNING
5.0 COMPUTER NETWORKS AND CLOUD NETWORKS 6.0 MICROSERVICE APPLICATIONS
7.0 HARDWARE OVERVIEW
8.0 MISCELLANEOUS; EXTENSIONS 1.0 General Overview Techniques are described herein for training and evaluating machine learning (ML) models using hybrid in-domain and out-of-domain vocabulary-based learning. In some embodiments, vocabulary-based development of ML models may include constructing a vocabulary that includes a set of tokens present in a training corpus of documents. A token in this context may be a single word (a unigram), two consecutive words (a bigram), or a phrase including a sequence of n number of words (an n-gram). A trained ML model may automatically learn and capture patterns of tokens in a training corpus of electronic documents that are associated with a particular label. A label in this context may be a classification, numeric value, a range of value, or any other set of one or more attribute values. The trained ML model may be applied to new electronic documents to generate predictions, recommendations, and/or trigger automated responses, as described further herein.

In some embodiments, in-domain machine-learning includes transforming a training corpus of documents into ML feature vectors based on, among other factors, the occurrence of vocabulary tokens in the particular training corpus of documents. During a training phase, the ML feature vectors may be used to learn model parameters. For example, the training process may cluster electronic documents in the multi-dimensional space of the ML feature vectors to learn the cluster centers in the feature vector space. As another example, the training process may learn, from the ML feature vectors, the boundaries of a hyperplane of a support vector machine (SVM) to classify social media posts as expressing positive or negative sentiment. During an evaluation phase, a new document may be transformed into an ML feature vector in the same manner, using the vocabulary tokens from the training corpus of documents, after which the trained ML model may be applied to estimate a label for the new document. These techniques may be characterized as "in-domain" since the ML feature vectors are generated based on the vocabulary from the training corpus of documents specific to a given domain. As a result, the techniques are able to effectively incorporate the characteristics of the specific domain into an ML model.

In some embodiments, out-of-domain machine learning includes generating ML feature vectors using a vocabulary extracted from an out-of-domain corpus of documents. Some approaches may include using an external service, such as Word2vec, to produce word embeddings from an out-of-domain vocabulary. Word embedding services may receive a relatively large corpus of documents from external sources as training input and generate a vector space in which each unique word in the corpus is assigned a corresponding vector. Word2Vec uses an artificial neural network model to produce the word vectors in the vector space such that similar words are positioned more closely in the vector space than words that are less similar or dissimilar. Similarity may be learned based on the linguistic context of words within the out-of-domain training corpus. With a large training corpus, word embedding models are able to estimate the linguistic context of a word, such as meaning in a given sentence, based on past usage patterns. The output of word embedding service may include an out-of-domain vocabulary in which each word token has a corresponding word vector. Given a document in a training corpus of documents, a training process may generate ML feature vectors as an aggregate (e.g., average) of the word vectors, provided by Word2Vec or any other word embedding service, for each token in the document. For a unigram token, the word vector itself may be used. For a bigram or other n-gram, a vector may be generated by averaging or otherwise combining the word vectors. The training process may then develop an ML model in the same manner as with in-domain learning, albeit using the ML feature vectors generated as a function of the out-of-domain vocabulary. The evaluation phase may also generate ML feature vectors as a function of the word embeddings and apply the model to generate predictions for new documents.

Out-of-domain machine learning allows for robust vocabularies extracted from a variety of sources. As a result, the trained ML model may be highly adaptable across different domains. However, the resulting ML model may fail to incorporate the characteristics of a specific domain into the ML model, negatively impacting the model's performance in ML applications that target a specific domain. For example, domain-specific terms and meanings that are not present in the out-of-domain training corpus may be ignored during model training and evaluation even though such domain-specific contexts may improve the robustness and accuracy of the ML model. Techniques described herein provide for hybrid in-domain and out-of-domain vocabulary-based learning, which allows for domain-specific characteristics to be learned and retained in the ML model while incorporating out-of-domain characteristics that are useful in estimating labels.

In some embodiments, hybrid learning includes generating ML feature vectors based on an in-domain vocabulary (i.e., a vocabulary constructed from a training corpus of a specific domain). When an unknown token (i.e., a token not present in the in-domain vocabulary) is identified in a new document, the evaluation process may replace the token with a nearest neighbor or neighbors among the vocabulary tokens. The nearest neighbor(s) may be determined based in part on an out-of-domain vocabulary and corresponding word embeddings. For example, the nearest neighbor may be the Word2Vec word vector for a known token in the in-domain vocabulary having the highest cosine similarity or smallest Euclidean distance to the Word2Vec word vector for the unknown token. If no reasonable nearest neighbor(s) among the vocabulary tokens is/are available (e.g., the distance exceeds a threshold), then the process may ignore the unknown token may be ignored. The process may then generate the new document's ML feature vector in the same manner as in-domain learning using any nearest neighbor tokens that have replaced unknown tokens.

In some embodiments, hybrid learning includes generating composite ML feature vectors. For a given document, a composite ML feature vector may include (a) a feature vector generated as a function of the occurrence of in-domain vocabulary tokens in the document and (b) the aggregated word vector representations for tokens that are not present in the in-domain vocabulary. The word vector representations may be determined using a service trained from an out-of-domain corpus, such as Word2Vec as previously mentioned.

In some embodiments, composite ML feature vectors are formed using a reduced in-domain vocabulary. A full vocabulary may initially be constructed from tokens extracted from a training corpus of electronic documents. The vocabulary may then be selectively reduced by removing one or more tokens from the fully constructed vocabulary. The manner in which tokens are selected for removal may vary depending on the particular implementation. For example, the selection may be made based on predetermined rules, ML model tuning (e.g., the tokens that yield that most robust ML model as determined through estimation error), or through curation by a domain expert. The composite ML feature vector for a new electronic document may be created in the same manner. However, unknown tokens in new electronic documents may not be representable through a vector representation (e.g., the token is absent from the out-of-domain vocabulary), whereas any such tokens in the training corpus may be incorporated into the in-domain vocabulary. If the evaluation process identifies an unknown token that is not representable through a vector representation, then the token may be ignored. Otherwise the vector representation may be incorporated into the second part of the ML composite feature vector.

One or more embodiments described in this Specification and/or recited in the claims may not be included in this General Overview section.

2.0 System Architecture

FIG. 1 illustrates an example system for constructing vocabularies for use in machine-learning applications in accordance with some embodiments. As illustrated in FIG. 1, system 100 includes clients 102a-b, ML application 104, data repository 126, and external resources 124a-b. System 100 and ML application 104 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, ML application 104 provides components through which inferences and adjustments may be automatically made during application runtime rather than relying on static instruction sets to perform tasks. The components may include vocabulary generator 106, vectorization service 108, feature extractor 122, ML engine 110, frontend interface 118, and action interface 120. However, as previously indicated the components of system 100, including ML application 104 may vary depending on the particular implementation.

In some embodiments, vocabulary generator 106 receives a set of electronic documents as input and automatically constructs a vocabulary based on extracted tokens. An electronic document in this context may include any electronic media content. Examples include, but are not limited to, webpages, Tweets and other social media posts, emails, spreadsheets, word processing files, video files, and image files. Vocabulary generator 106 may be configured to process documents that conform to varying file formats and encodings. For example, webpages may be encoded according to one or more versions of hypertext markup language (HTML), extensible markup language (XML), Cascading Style Sheets (CSS), JavaScript, and/or other programming languages. A token may be a data object that uniquely identifies one or more words within an electronic document. In some embodiments, a token uniquely identifies a single word. Tokens representing individual items are referred to herein as unigrams. Additionally or alternatively, a vocabulary may include tokens that uniquely identify a sequence of words, such as a phrase. Tokens representing multiple items are referred to herein as n-grams.

In some embodiments, vectorization service 108 is configured to process unknown tokens within an input electronic document. An unknown token may be a unigram or an n-gram that is not included in a target vocabulary. The target vocabulary may be a full vocabulary extracted from a training corpus of electronic documents or a reduced vocabulary where one or more tokens have been selectively removed, depending on the particular implementation. Vectorization service 108 may replace unknown tokens with a nearest neighbor or neighbors within the target vocabulary or may generate an aggregate vector representation for the unknown tokens, as described further herein.

In some embodiments, vectorization service 108 processes unknown tokens based on an out-of-domain vocabulary. An out-of-domain vocabulary in this context refers to a vocabulary that includes tokens that were not extracted from the training corpus of electronic documents. The out-of-domain vocabulary may use a different corpus of documents to extract tokens, which may include documents in separate domains from those in the training corpus.

In some embodiments, vectorization service 108 is a word embedding service that receives a relatively large corpus of documents from external sources as training input and generates a set of word embeddings. A word embedding in this context refers to a vector representation that is generated based in part on linguistic context. Unique words with similar linguistic contexts may be assigned corresponding vectors that have greater cosine similarity or smaller Euclidean distances than words with dissimilar contexts. A linguistic context may be determined based on semantic and/or lexical analysis. For example, word meanings may be inferred based on frequency of co-occurrence with other words, prefixes, suffixes, stems, parts of speech, and/or positions within a sentence. Vector space models, such as the continuous bag-of-words model or the skip-gram model, may be trained to assign semantically similar words to nearby points within the vector space.

In some embodiments, vectorization service 108 provides an interface to an external web service to process unknown tokens. For example, vectorization service 108 may send a list of unknown tokens and contextual information to a service, such as Word2Vec, which may return a list of vector representations for each unknown token. As previously indicated, Word2Vec uses a multi-layer artificial neural network model to produce word vectors in a vector space such that similar words are positioned more closely in the vector space than words that are less similar or dissimilar.

In some embodiments, feature extractor 122 is configured to identify feature values and form feature vectors for an input document based on the occurrence of tokens in the automatically-generated, in-domain vocabulary and any unknown tokens, if any. A feature vector may comprise a sequence of values, with each value representing a different vocabulary token. For example, vocabulary $[v_1, v_2, v_3]$ includes three vocabulary tokens, $v_1$, $v_2$, and $v_3$. Feature extractor 122 may use the vocabulary to generate feature vector $[f_1, f_2, f_3]$ for an input document, where $f_1$ corresponds to $v_1$, $f_2$ corresponds to $v_2$, and $f_3$ corresponds to $v_3$. Feature extractor 122 may assign values to each element of the feature vector based on whether the corresponding token occurs in the electronic document. In some embodiments, one or more of the feature values may include a value for a token that replaced an unknown token or an aggregate vector representation for the unknown tokens. Examples for assigning are described in further detail below.

ML engine 110 is configured to automatically learn, from a training dataset, patterns leading to particular outcomes and to output predicted outcomes for new examples. ML engine 110 includes training logic 112 for training ML models, estimation logic 114 for estimating unknown labels for new examples, and tuning logic 116 for optimizing the parameters of ML models. Techniques for training ML models, outputting estimates, and tuning model parameters are described in further detail in the sections below.

Frontend interface 118 manages interactions between ML application 104 and clients 102*a-b*. For example, a client may submit requests to perform various functions and view results through frontend interface 118. A client in this context may be a human user, such as a system administrator, or another application, such as a shell or client application.

In some embodiments, frontend interface 118 is a presentation tier in a multitier application. Frontend interface 118 may process requests received from clients, such as clients 102*a-b*, and translate results from other application tiers into a format that may be understood or processed by the clients. Frontend interface 118 may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, action interface 120 provides an interface for executing actions using computing resources, such as external resources 124*a-b*. Action interface 120 may include an API, CLI, or other interface for invoking functions to execute actions. One or more of these functions may be provided through cloud services or other applications, which may be external to ML application 104. For example, one or more components of system 100 may invoke an API of an email client application to transmit a targeted email message to a list of recipients. As another example, an API of a publishing tool may be invoked to trigger a targeted social media post to one or more social media platforms for a list of social media users. In yet another example, action interface 120 may submit commands to reconfigure software and/or hardware resources on a given list. Thus, the actions that are performed may vary from implementation to implementation.

In some embodiments, actions may be automatically triggered based on outputs received from ML engine 110. For example, action interface 120 may trigger an action for a given list of recipients if and only if the estimated label satisfies a particular threshold. In the context of campaign analytics, for instance, action interface 120 may publish a targeted campaign message to a given list of recipients if and only if the estimated click-through rate exceeds a threshold. As another example, action interface 120 may push a patch set update (PSU) on a given set of software deployments if and only if the estimated failure rate is lower than a threshold. Additionally or alternatively, other actions may also be triggered depending on the particular implementation. Additionally or alternatively, actions may be triggered responsive to client requests received through frontend interface 118.

In some embodiments, external resources 124*a-b* are network services that are external to ML application 104. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources 124*a-b*. Action interface 120 may process and translate inbound requests to allow for further processing by other components of ML engine 110. Action interface 120 may store, negotiate, and/or otherwise manage authentication information for accessing external resources 124*a-b*. Example authentication information may include, but is not limited to, digital certificates, cryptographic keys, usernames, and passwords. Action interface 120 may include authentication information in the requests to invoke functions provided through external resources 124*a-b*.

In some embodiments, ML application 104 is a cloud service, such as a software-as-a-service (SaaS) or a web service. Clients, such as clients 102*a-b*, may be a web browser, mobile application, or other software application communicatively coupled to a network. A client may interact with cloud services using one or more communication protocols, such as HTTP and/or other communication protocols of the Internet Protocol (IP) suite. In other embodiments, ML application 104 may be locally accessible to a user, such as a desktop or other standalone application.

In some embodiments, data repository 126 stores data generated and/or otherwise accessed by components of ML application 104. Example data may include, but is not limited to, trained ML models, generated vocabularies, feature vectors, GUI data, and electronic documents. Data repository 126 may be any type of storage unit and/or device (e.g., a file system, database, collection of tables, or any other storage mechanism) for storing data. Further, data repository 126 may include multiple different storage units and/or devices. The multiple different storage units and/or devices may or may not be of the same type or located at the same physical site. Further, data repository 126 may be implemented or may execute on the same computing system as one or more other components of system 100. Alternatively or additionally, data repository 126 may be implemented or executed on a computing system separate from one or more other components of system 100. Data repository 126 may be communicatively coupled to one or more components illustrated in system 100 via a direct connection or via a network.

Additional embodiments and/or examples relating to computer networks and microservice applications are described below in Section 5.0, titled "Computer Networks and Cloud Networks" and Section 6.0, titled "Microservice Applications".

3.0 Hybrid in-Domain and Out-of-Domain Document Processing 3.1 In-Domain Vocabulary Construction In some embodiments, an in-domain vocabulary comprises a set of tokens that are extracted from a corpus of documents that are associated with a specific sphere of machine learning activity or other computing application. In some embodiments, the tokens are extracted from a corpus of labeled documents used to train a machine-learning model to estimate labels or predict metrics for a given application. For example, the tokens may be extracted from a set of labeled Tweets including embedded hyperlinks, where the labels identify click-through rates for various lists of recipients. An in-domain vocabulary for the Tweets may be generated by extracting unique tokens from the Tweets and adding the tokens to the vocabulary. The in-domain vocabulary may be useful to capture and learn domain-specific vocabulary patterns when training a machine-learning model to predict click-through rates for future Tweets. Other domain-specific vocabularies may also be constructed, depending on the particular implementation. Documents that belong to a specific domain may be grouped by a common characteristic or set of characteristics/attributes.

In some embodiments, a vocabulary token is a data object that uniquely identifies content. For example, a textual token may be an alphanumeric string value of a corresponding word (unigram) or phrase (n-gram) extracted from one or more webpages, social media posts, emails, and/or other electronic documents. In other examples, the token may be a shortened prefix of the word or phrase or a hash value generated by applying a hash function to the word or phrase that is mapped to the word or phrase. Other encodings may also be used, depending on the particular implementation.

Figure 2:
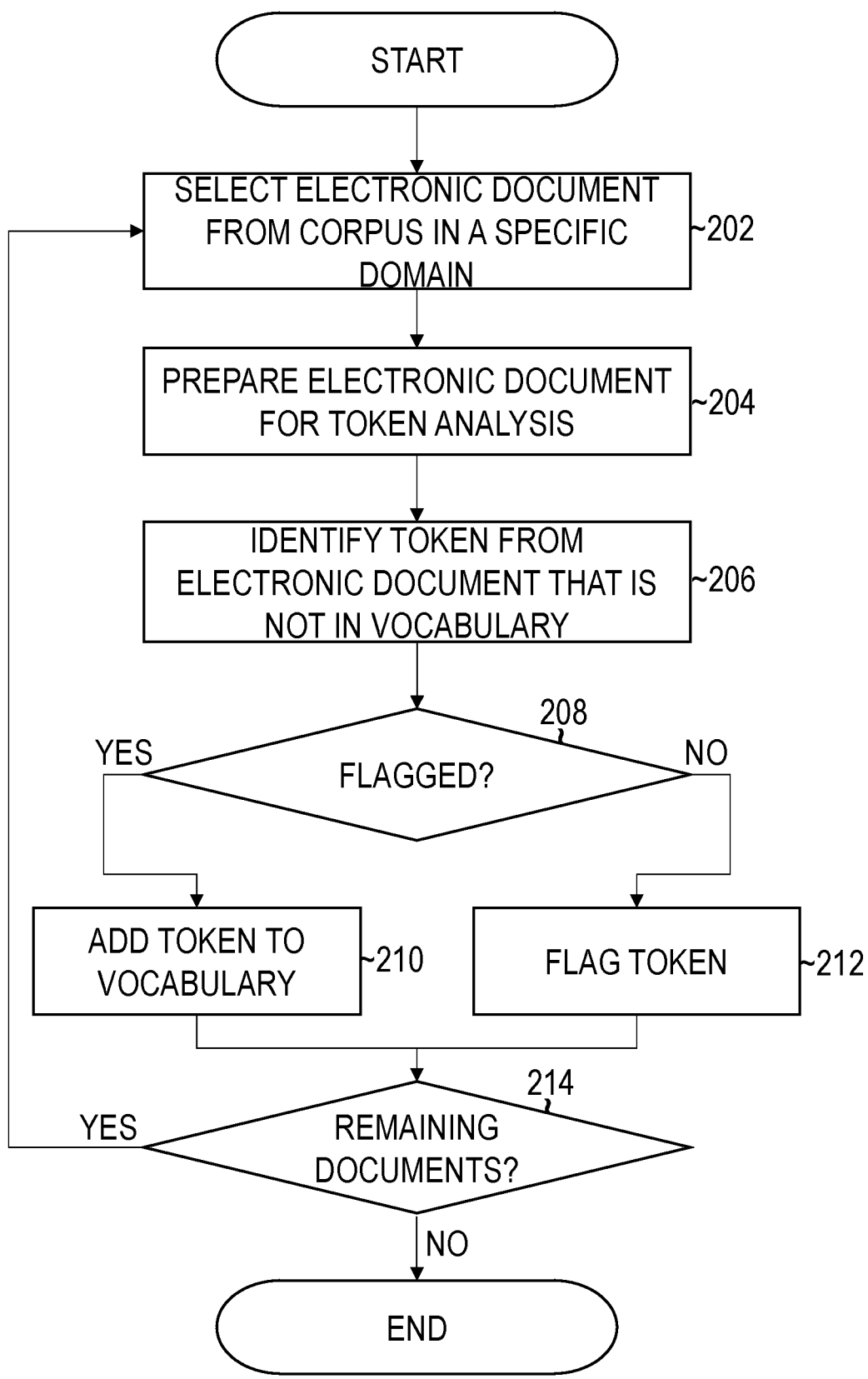
FIG. 2 illustrates an example set of operations for generating an in-domain vocabulary in accordance with some embodiments.

FIG. 2 illustrates an example set of operations for generating an in-domain vocabulary in accordance with some embodiments. One or more operations illustrated in FIG. 2 may be modified, rearranged, or omitted. Accordingly, the particular sequence of operations illustrated in FIG. 2 should not be construed as limiting the scope of one or more embodiments.

Referring to FIG. 2, the process includes selecting an electronic document from a corpus of documents in a specific domain (operation 202). In some embodiments, the corpus of documents is the same set of documents used by training logic 112 to train an ML model.

The process further includes preparing the electronic document for token analysis (operation 204). In some embodiments, this operation includes cleaning the document to remove content to prevent certain tokens from being added to a vocabulary. For example, certain textual tokens, such as the articles "a" and "the", may be so common that there may be no benefit to ML application 104 if included in the vocabulary. By removing the content, the size of the vocabulary may be reduced, which may help to limit the storage overhead and improve runtime performance of ML application 104.

The process further identifies a token from the electronic document that is not already in the vocabulary (operation 206). The identified token may be a unigram or an n-gram.

The process further includes determining whether the identified token was previously flagged (operation 208). In some embodiments, tokens are only added to the vocabulary if the tokens occur in a threshold number of electronic documents. Tokens that occur in only one electronic document may not convey much meaning to ML application 104. Therefore, a default of two or more may be used; however, the threshold may be configurable by a user and/or otherwise vary depending on the particular implementation.

If the token has been flagged indicating that it has not already occurred in another previously processed electronic document, then the process adds the token to the vocabulary (operation 210). Otherwise, the process flags the token (operation 212). In other embodiments, any unique token that is identified may be added to the vocabulary. Thus, operations 208 and 212 may be omitted.

The process further determines whether there are any remaining documents in the corpus of documents (operation 214). If so, then the process iterates through operations 202-214 for the remaining documents.

Once the process in FIG. 2 is complete, the result is a vocabulary of tokens extracted from the corpus of documents in a specific domain. The vocabulary may be used to from ML feature vectors as described further herein.

3.2 In-Domain Token Weighting

In some embodiments, vocabulary tokens are assigned weights based on domain-specific characteristics. The weight of a token may indicate a domain-specific relevance of the token to ML application 104.

In some embodiments, token weights are assigned in a manner that is inversely related to the occurrence frequency within the corpus of documents used to construct the in-domain vocabulary. Tokens that frequently occur across different documents may have limited meaning for ML application 104. For example, an image that occurs in all documents in the training corpus may not be useful for a classification model. To provide a measure of how much meaning a token provides, the weight may be lower the more frequently the token occurs across documents.

In some embodiments, tokens may be assigned a weight using an inverse document frequency formulation. For example, the weight may be assigned as follows:

$$w_i(v_i \in V, D) = \log \frac{N}{1 + |\{d \in D : v_i \in d\}|}$$

where D is the corpus of documents used to construct the vocabulary V, N is the total number of documents in the corpus D, and $|\{d \in D: v_i \in d\}|$ is the number of documents in the corpus D that include at least one occurrence of vocabulary token $v_i$.

3.3 Token Replacement Based on Out-of-Domain Characteristics

Vocabularies may be used to generate feature vector representations of documents. For instance, vocabulary [$v_1$, $v_2$, $v_3$] includes three vocabulary tokens, $v_1$, $v_2$, and $v_3$. Feature extractor 122 may use the vocabulary to generate feature vector [$f_1$, $f_2$, $f_3$] for an input document, where $f_1$ corresponds to $v_1$, $f_2$ corresponds to $v_2$, and $f_3$ corresponds to $v_3$. Feature extractor 122 may assign values to each element of the feature vector based on whether the corresponding token occurs in the electronic document.

Documents that were not part of the corpus used to construct the vocabulary may include unknown tokens (i.e., a token that is not included in the in-domain vocabulary). For example, a new document may include one or more unigrams and/or one or more n-grams that were not present in any documents in the training corpus. These tokens may be ignored when generating a vector representation for the document. However, the unknown tokens may be relevant to estimating a label for the document or predicting a metric value for actions taken with respect to the document.

In some embodiments, feature extractor 122 is configured to replace unknown tokens with a nearest neighbor token or tokens that is/are present in the in-domain vocabulary. The nearest neighbor(s) may be determined based on out-of-domain characteristics of the token determined from a word embedding service. For example, vectorization service 108 may identify the nearest point in the vector space that corresponds to a known token (i.e., a token present in the in-domain vocabulary). Tokens that are close together may convey similar or identical meanings depending on the particular linguistic context, such as the case with synonymous words. By replacing the unknown token with the nearest neighbor(s), out-of-domain characteristics for the unknown token allow for in-domain learned characteristics for a linguistically similar token to be applied.

Figure 3A:
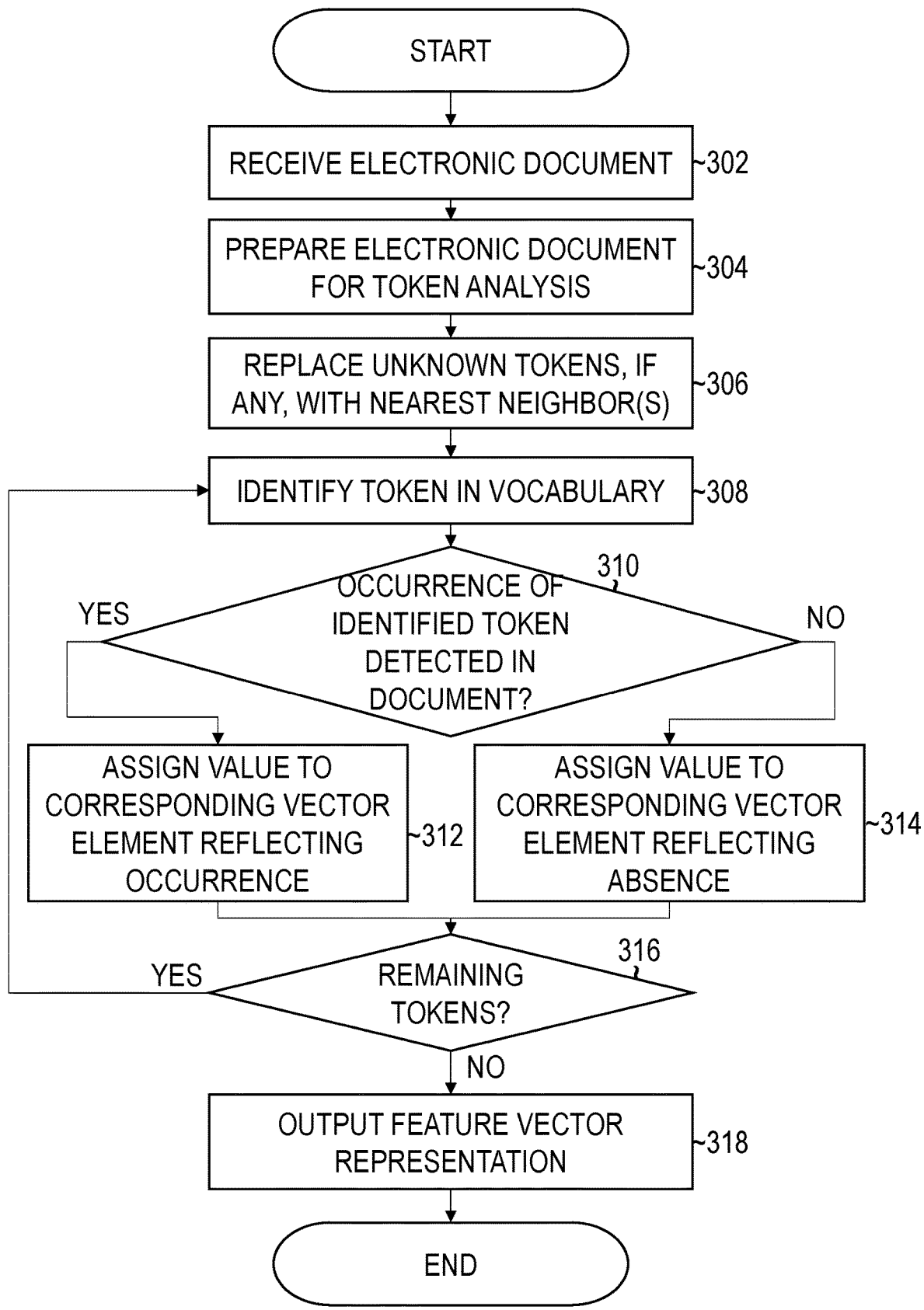
FIG. 3A illustrates an example set of operations for generating a feature vector representation for an electronic document where unknown tokens are replaced in accordance with some embodiments.

FIG. 3A illustrates an example set of operations for generating a feature vector representation for an electronic document where unknown tokens are replaced in accordance with some embodiments. One or more operations illustrated in FIG. 3A may be modified, rearranged, or omitted. Accordingly, the particular sequence of operations illustrated in FIG. 3A should not be construed as limiting the scope of one or more embodiments.

Referring to FIG. 3A, the process includes receiving an electronic document as input (operation 302). In some embodiments, the electronic document is a new document (e.g., a newly composed Tweet, webpage, email, etc.) that includes tokens that have not previously been encountered during construction of the in-domain vocabulary.

The process further includes preparing the electronic document for token analysis (operation 304). In some embodiments, the process uses the same techniques to prepare the electronic document as are used in operation 204 in the set of operations depicted in FIG. 2. For example, the process may remove common text and/or other content from the electronic document.

The process further includes replacing unknown tokens, if any, with the nearest neighbor(s) (operation 306). In some embodiments, the process compares remaining tokens that have not been removed during cleaning with tokens in the in-domain vocabulary. If an unknown token is identified (i.e., no matching token is found in the vocabulary), then the vectorization service 108 is invoked to identify the nearest neighbor(s) among the tokens in the vocabulary. The nearest neighbor(s) may be the point(s) (corresponding to vocabulary-tokens) in the vector space with the greatest cosine similarity or the smallest Euclidean distance. The result of operation 306 may be a list that includes (a) known tokens extracted from the electronic document and (b) replacement tokens that are known and have replaced unknown tokens with similar linguistic contexts.

In some embodiments, a single unknown token is replaced with a single vocabulary token corresponding to the nearest neighbor (i.e., the point in the vector space, among points corresponding to vocabulary tokens, with the greatest cosine similarity or smallest Euclidean distance). In other embodiments, an unknown token is replaced with multiple known tokens. For example, the multiple known tokens may include the top n closest known tokens in the vector space to the unknown token, including the nearest token, the second nearest token, etc. In other cases, the multiple tokens may include all tokens within a threshold distance to the unknown token. The multiple known tokens may be assigned weights or occurrence values as a function of their cosine similarity or Euclidean distance to the unknown token, as described further below.

If the distance between the point in vector space representing the unknown token and the point representing the nearest known neighbor corresponding to vocabulary-tokens is relatively large, then the nearest-neighbor vocabulary-token may have a significantly different semantic meaning and, therefore, may not be a reasonable replacement (and the same applies for the second-nearest-neighbor vocabulary-token and so on). Thus, if the distance exceeds a threshold, the unknown token may be ignored such that it is not factored into a vector representation of the document. For instance, the unknown token may be removed from the list of tokens extracted from the documents without being replaced by another token.

A point in the vector space may be a vector representation, such as a Word2vec word vector, that is mapped to a corresponding word in an out-of-domain vocabulary. The out-of-domain vocabulary may thus include tokens that are not in the in-domain vocabulary and at least a subset of the in-domain vocabulary tokens. In some embodiments the in-domain vocabulary includes tokens that are not in the out-of-domain vocabulary (i.e., domain-specific unigrams and/or n-grams).

Referring again to FIG. 3A, the process further includes selecting a token from the vocabulary (operation 308). For example, in the three-token vocabulary $[v_1, v_2, v_3]$, the process may select the first token in the list, $v_1$, to begin the analysis. It is noted that the number of tokens in a vocabulary may generally include significantly more tokens, but the exact number may vary depending on the particular implementation and the training corpus of documents.

The process further includes searching for occurrences of the vocabulary token in a set of tokens that includes (a) known tokens extracted from the electronic document and (b) replacement tokens that are known and have replaced unknown tokens with similar linguistic contexts (operation 310).

If a match is detected, then the process assigns a value to the corresponding vector element to reflect occurrence of the vocabulary token (operation 312). Otherwise, if no match is detected, then the process assigns a value to the corresponding vector element to reflect the absence of the token (operation 314). The value that is assigned may vary depending on the particular implementation. In some embodiments, the value may be binary in nature to reflect that the token either occurred or did not. For example, if $v_1$ is detected in an electronic document, then a value of 1 may be assigned, otherwise a value of 0, may be assigned. In other embodiments, the value may reflect a count or frequency with which the token occurred in the document. For example, a token occurring two times may be assigned a value of 2, a token occurring three times a value of 3, etc.

When an unknown token is replaced by multiple known tokens, occurrence values may be assigned to each of the known tokens as a function of the distance (or similarity) between the known token and the unknown token being replaced. For example, a higher value may be assigned the closer the known token is to the unknown token. The occurrence values may be normalized based on how many known tokens there are in the set that is replacing the known token. In some embodiments, the sum of the occurrence values across all known tokens in the replacement set may be 1. For instance, if tokens $[v_1, v_2]$ replace unknown token $v_3$, then the tokens may be assigned occurrence values [0.7, 0.3], indicating that $v_1$ is closer than $v_2$ to $v_3$ with the sum of the occurrence values totaling 1.

In some embodiments, the occurrence frequency or count may be a non-integer value. For instance, when the token is part of a set used to replace an unknown token, then the occurrence frequency/count may be incremented by a fractional amount as a function of the distance of the token to the unknown token relative to other known tokens in the set. The non-integer occurrence values may be aggregated based on other occurrences of the known token (either via replacement of other unknown tokens or direct uses in the document). For example, in the example where $[v_1, v_2]$ were assigned the occurrence values [0.7, 0.3] based on normalized distance measures to unknown token $v_3$, the process may detect another direct occurrence of $v_1$ in the document. As a result, the occurrence value may be incremented by 1 to yield an occurrence value of 1.7 for the document. This value may be weighted or unweighted in a feature vector representing the electronic document.

Additionally or alternatively, the vocabulary weightings previously described may be applied to compute the feature value. For example, if $v_1$ has a weight of 0.2, and the token occurs 2 times in the electronic document, then a value of 0.2×2=0.4 may be assigned. In this example, the occurrence frequency in the document itself increases the weight of the feature value, but the occurrence frequency in documents used to construct the vocabulary decreases the weight. Thus, the feature weight for a respective token may be inversely related to the frequency of the respective token in the plurality of documents. The values provided above are to facilitate understanding; the exact values per occurrence and manner in which they are normalized may vary depending on the particular implementation.

In some embodiments, replacement tokens may be weighted differently than tokens extracted directly from the electronic document. For example, the weight may have an inverse relationship to the Euclidean distance or cosine similarity of the token that is being replaced. Thus, the more dissimilar the linguistic context between the replacement token and the unknown token, the lower the weight to reflect the level of uncertainty on the interchangeability of the two words.

The process further determines whether there are any remaining tokens to analyze (operation 316). If so, then the process iterates through the tokens in the vocabulary and assigns a feature value to a corresponding vector element.

The process further outputs the feature representation (operation 318). The result is a v-long vector where v represents the number of tokens in the vocabulary. For example, an electronic document may have a feature vector representation [0.2, 0, 0.6] based on the three-token vocabulary [$v_1$, $v_2$, $v_3$] based on the occurrence frequency and weights of each of the three tokens within the document.

3.4 Composite Vector Formation

In some embodiments, hybrid learning includes generating composite ML feature vectors. For a given document, a composite ML feature vector may composed by concatenating two or more feature vectors including (a) a feature vector generated as a function of the occurrence of in-domain vocabulary tokens in the document and (b) the aggregated word vector representations for tokens that are not present in the in-domain vocabulary. Thus, one part of the ML feature vector may embody in-domain characteristics of an electronic document and another part may embody out-of-domain characteristics.

In some embodiments, the word vector representations are determined using a service trained from an out-of-domain corpus, such as Word2Vec as previously mentioned. A Word2Vec word vector representation includes a vector of weighted values, where each weighted value/vector element corresponds to a different out-of-domain feature or characteristic. Different corresponding neurons within a hidden layer of the neural network may be trained to assign values to each feature based on patterns learned from an out-of-domain corpus of documents. For example, the vector 0.99, 0.5, 0.2 may indicate that there is a 99% probability that the word has the first linguistic context, a 50% chance that it has a second linguistic context, and a 20% chance that it has a third linguistic context. One implementation of Word2Vec generates word vectors having 300 elements. However, the length may vary depending on the particular implementation.

Figure 3B:
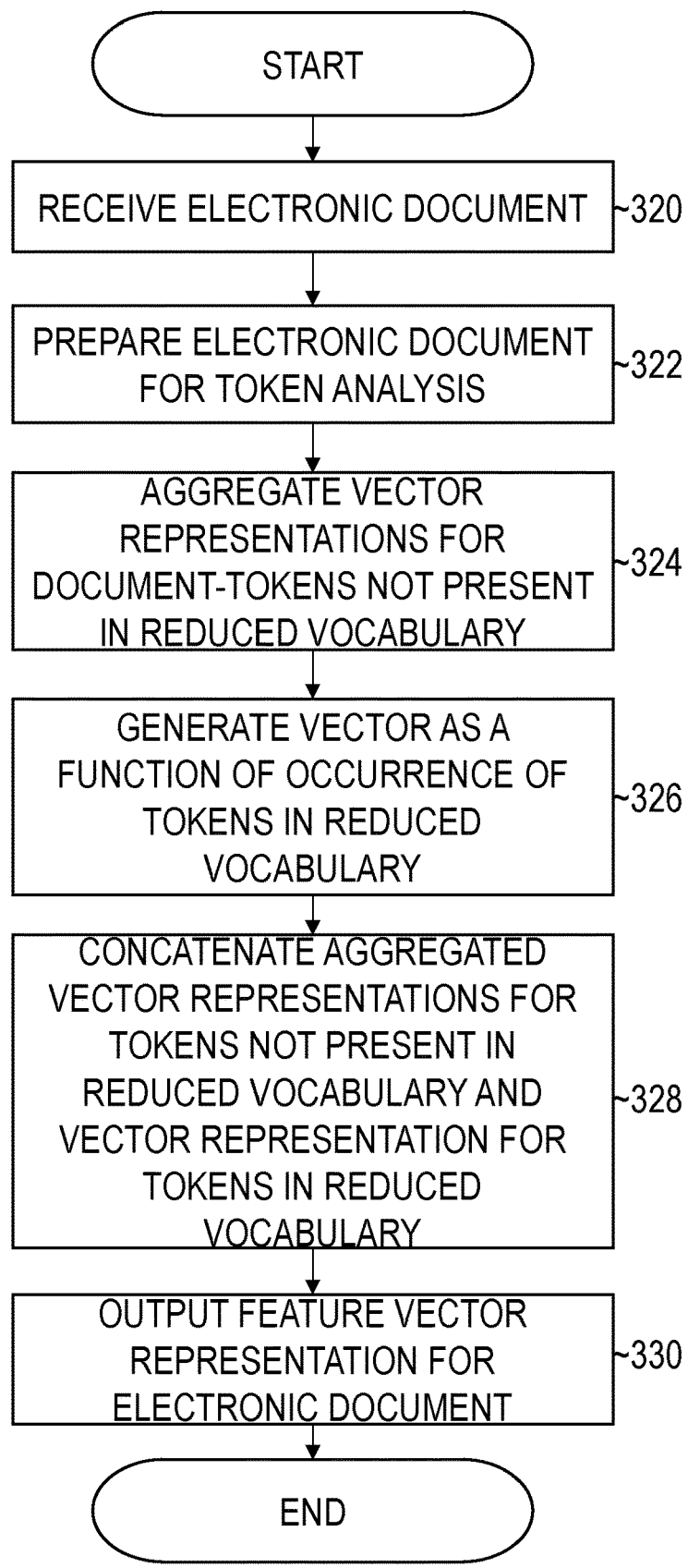
FIG. 3B illustrates an example set of operations for generating a feature vector representation for an electronic document using a composite vector in accordance with some embodiments.

FIG. 3B illustrates an example set of operations for generating a feature vector representation for an electronic document using a composite vector in accordance with some embodiments. One or more operations illustrated in FIG. 3B may be modified, rearranged, or omitted. Accordingly, the particular sequence of operations illustrated in FIG. 3B should not be construed as limiting the scope of one or more embodiments.

Referring to FIG. 3B, the process includes receiving an electronic document as input (operation 320). The process further includes preparing the electronic document for token analysis (operation 322). In some embodiments, operations 320 and 322 may mirror operations 302 and 304 of FIG. 3A.

Referring to FIG. 3B, the process aggregates vector representations for document-tokens not present in the reduced vocabulary (operation 324). The document-tokens may be unknown (i.e., not included in a full vocabulary), or may be present in the full vocabulary but not in the reduced vocabulary. The latter scenario may occur during ML model training as described further below. In some embodiments, vectorization service 108 may be invoked to query for the Word2Vec representations of each document-token that is not present in the reduced vocabulary. An aggregate vector representation may be generated by averaging the vector elements together. For instance, if there are two unknown tokens with the following word vectors: [0.7, 0.2], [0.5, 0.1], then an aggregate vector representation may be [0.6, 0.15]. In other embodiments, different aggregation functions may be applied, such as summing, computing the mode, etc.

The process further comprises generating the vector as a function of the occurrence of the known tokens in a reduced vocabulary (operation 326). A reduced vocabulary is one in which one or more tokens from a full vocabulary have been removed. Reducing a full vocabulary may optimize ML training using out-of-domain vector aggregations. Otherwise, during the training phase, there is a risk of there being no unknown tokens, which negates ability to extract meaningful information from the out-of-domain part of the ML feature vectors.

In some embodiments, operation 326 includes performing operation 308-316 of FIG. 3A. However, in the case of operation 326, the set of tokens may not include replacement tokens but only tokens extracted directly from the electronic document. Thus, operation 326 may produce the in-domain part of the composite feature vector.

The process further includes concatenating the aggregated vector representation for the tokens not present in the reduced vocabulary and the vector representation for the tokens in the reduced vocabulary (operation 328). In some embodiments, the aggregated vector representation is added to the end of the in-domain vector representation. However, the order may vary depending on the particular implementation.

The process further outputs the feature representation (operation 318). The result is a v+m-long vector where v represents the number of tokens in the reduced vocabulary and m represents the length of a word vector representation in the vector space model. For example, an electronic document may have a feature vector representation [0.2, 0, 0.6, 0.6, 0.15] based on the three-token vocabulary [$v_1$, $v_2$, $v_3$] and the two-element aggregate word representation in the examples previously given. Generally, the length of both vectors may be much longer; however, abbreviated vectors have been provided to facilitate explanation.

In the examples above, the vectors were of length v or v+m. In other embodiments, feature extractor 122 may append other features to the feature vector and/or an aggregate vector representation for unknown tokens. For instance, the feature vector in the previous examples may include one or more non-vocabulary features. Example non-vocabulary features may include, but are not limited to, the number of words in an electronic document, the target recipient(s) for the electronic document, the number of images in an electronic document, the runtime of a video included in the electronic document, and/or other attributes associated with the electronic document. Thus, the length of the feature vector may vary from implementation to implementation.

4.0 Machine-Learning Optimizations and Applications 4.1 Process Overview: Token Replacement In some embodiments, the vocabulary-based vector representations of documents are used to train and apply ML models. The vector representations allow ML models to learn vocabulary patterns in electronic documents. A trained ML model may estimate unknown labels for documents based at least in part on the learned vocabulary patterns.

In some embodiments, the process depicted in FIG. 3A is used to generate vector representations for documents during model training and evaluation. In the training phase, the training corpus may not include any unknown tokens that need replacement since the corpus may be used to construct the in-domain vocabulary. However, there may be implementations where a reduced vocabulary is used or only a sample of the training documents are used to construct the vocabulary. New documents received during the evaluation phase may be more likely to include unknown tokens as the text therein was not used to construct the documents. In either case, unknown tokens may be replaced with their nearest neighbors to generate the vector representation for the document.

Figure 4:
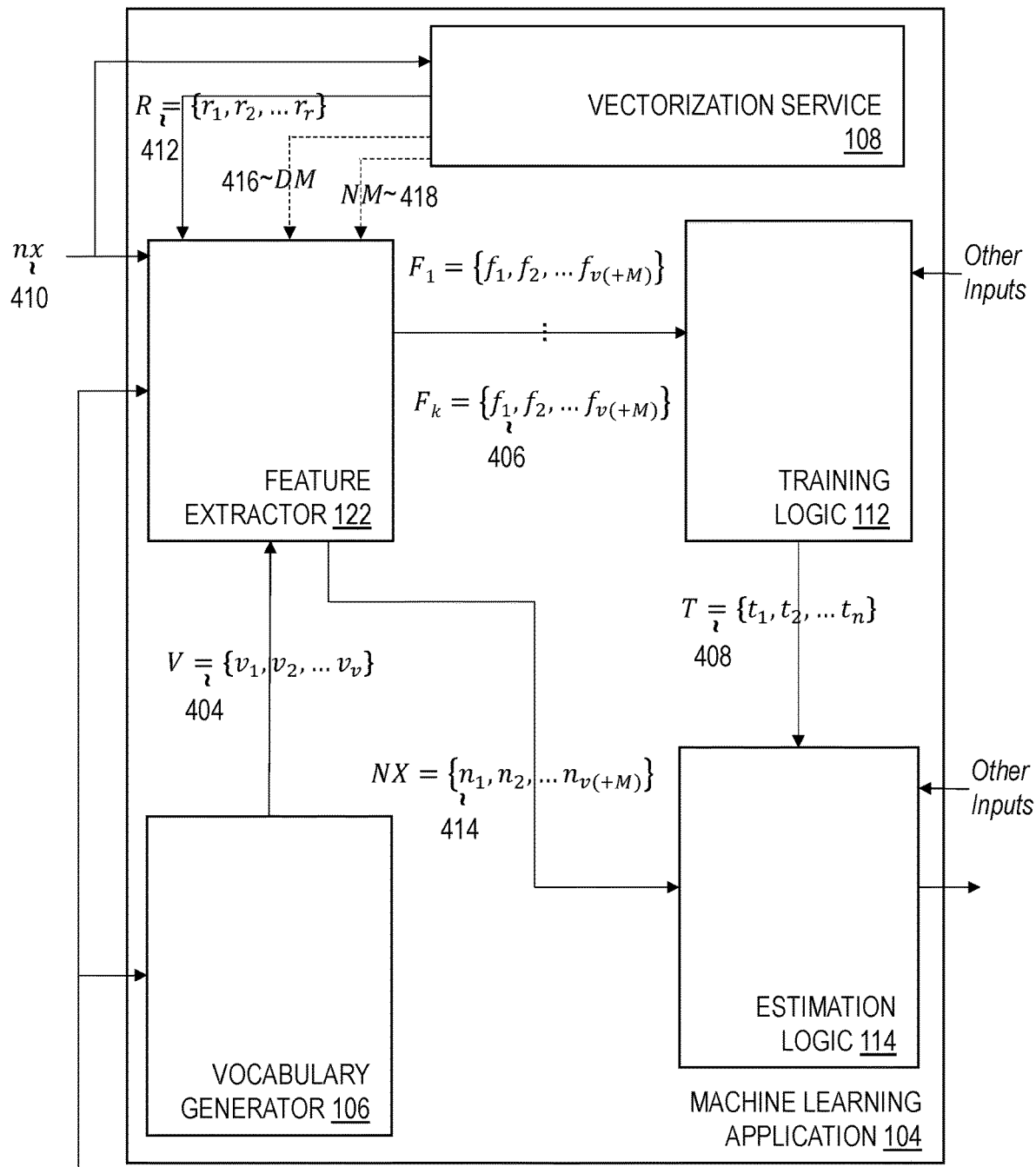
FIG. 4 illustrates an example dataflow for training and applying machine-learning models in accordance with some embodiments.

FIG. 4 illustrates an example dataflow for training and applying machine-learning models in accordance with some embodiments. The dataflow include feeding, as input to vocabulary generator 106 and feature extractor 122, training corpus 402, which is denoted D and includes k documents $\{d_1, d_2, \ldots d_k\}$.

Vocabulary generator 106 may execute the process depicted in FIG. 2 to construct vocabulary 404, which is denoted V and includes v tokens $\{v_1, v_2, \ldots v_v\}$. The tokens may include unigrams (e.g., single words) and/or n-grams (e.g., words and phrases).

Feature extractor 122 may execute the process depicted in FIG. 3A on training corpus 402 using vocabulary 404 to generate a set of k v-long feature vectors 406, denoted $F_1$ to $F_k$. Each vector represents a different document within training corpus 402. Each vector representation may include values corresponding to v tokens in vocabulary 404 and be assigned values based on the occurrence in the document being represented by the vector.

Training logic 112 receives the set of feature vectors 406 as input. In some embodiments, training logic 112 may further receive other inputs, such as model parameters, document labels, and/or other feature values. As previously described, vocabulary feature vectors may be combined with other features. The resulting ML feature vector may be used to train one or more ML models. Techniques for training ML models are described further below. The output of training logic 112 is a trained ML model 408, denoted T and including ML artifacts $\{t_1, t_2, \ldots t_n\}$. An ML artifact may vary depending on the ML model. Examples may include, without limitations, weighted connections between neurons inside of an artificial neural network, support vector machine weights, decision tree parameters, and/or other model components for estimating a label as a function of an input ML feature vector.

During an evaluation phase, new document 410, denoted nx, is fed as input to feature extractor 122. Feature extractor 122 may invoke vectorization service 108 to query for the nearest neighbors of any unknown tokens in document nx. In response to the query, vectorization service 108 may return a list of one or more replacement tokens 412, denoted R, including $\{r_1, r_2, \ldots r_r\}$.

Feature extractor 122 further generates v-long feature vector 414, denoted NX and including feature values $\{n_1, n_2, \ldots n_v\}$, using vocabulary 404. The feature values include weighted values for the vocabulary tokens extracted directly from nx and those that replace unknown tokens included in the list of one or more replacement tokens 412.

Feature vector 414 is fed as input to estimation logic 114. Estimation logic 114 also receives other inputs such as additional feature values and/or model configuration settings. It is noted that the other inputs fed to estimation logic 114 do not include document labels for new document 410 since the label is unknown. Estimation logic 114 applies ML model 408 to estimate a label for new document 410. The estimated label may be used by machine learning application 104 to execute one or more automated actions as described further below.

4.2 Process Overview: Vector Aggregation

FIG. 4 further depicts an alternate dataflow where the process depicted in FIG. 3B is used to generate vector representations for documents during model training and evaluation. In this case vocabulary 404 may be correspond to a selectively reduced vocabulary that is obtained by removing one or more tokens from the fully constructed vocabulary. The manner in which tokens are selected for removal may vary depending on the particular implementation. For example, the selection may be made based on predetermined rules (e.g., remove tokens that are distributed evenly in the vector space model), based on ML model tuning (e.g., the tokens that yield that most robust ML model as determined through estimation error), or through curation by a domain expert (e.g., remove a provided list of words and/or phrases from the vocabulary).

During the training phase, vectorization service 108 returns an aggregate vector representation 416, denoted DM, for each document in training corpus 402. The aggregate vector may be concatenated to the in-domain vector component for the corresponding document as previously described. The result is that the set of k feature vectors 406 are v+m in length (instead of v in length in the token replacement scenario) where v represents the number of tokens in the vocabulary, which is reduced in this case, and m is the length of the aggregate vector representation.

During the evaluation phase, vectorization service 108 returns aggregate vector representation 418, denoted NM, for new document 410. As a result, feature vector 414 is also v+m in length (instead of v in length in the token replacement scenario) where v represents the number of tokens in the vocabulary, which is reduced in this case, and m is the length of the aggregate vector representation.

Feature vector 414 may then be fed as input to estimation logic 114 in the same manner previously described. Estimation logic 114 further receives other inputs and applies ML model 408 to estimate a label for new document 410. The estimated label may be used by machine learning application 104 to execute one or more automated actions as described further below.

4.3 Model Training

Figure 5:
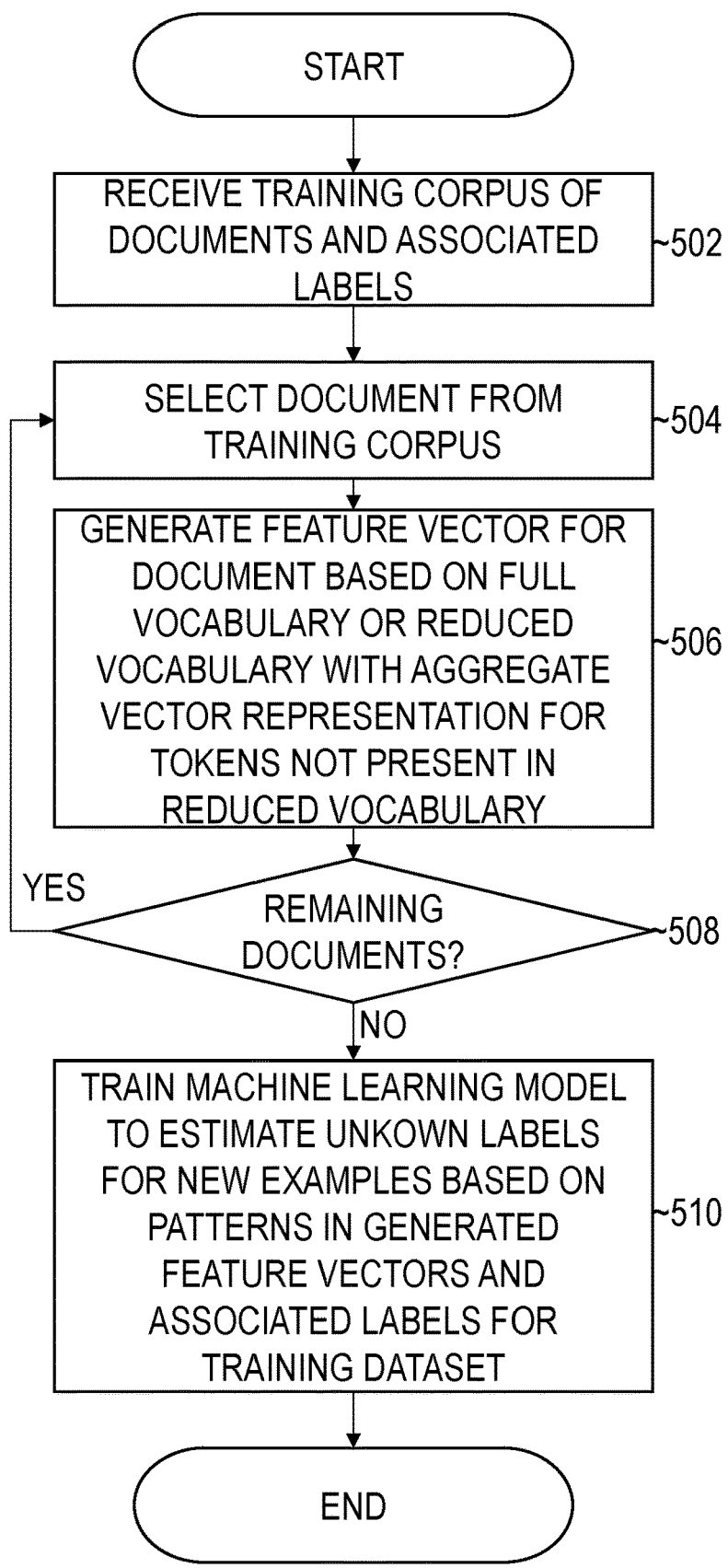
FIG. 5 illustrates an example set of operations for training a machine-learning model in accordance with some embodiments.

FIG. 5 illustrates an example set of operations for training a machine-learning model in accordance with some embodiments. One or more operations illustrated in FIG. 5 may be modified, rearranged, or omitted. Accordingly, the particular sequence of operations illustrated in FIG. 5 should not be construed as limiting the scope of one or more embodiments.

The training process includes receiving a training corpus of documents and associated labels (operation 502). A label in this context refers to a classification or metric associated with an electronic document. For instance, a label may identify the click-through rate for a hyperlink included in the electronic document or a sentiment classification for viewers of the document. Other classifiers and/or metrics may also be assigned depending on the particular implementation. A user may manually assign labels to the documents or the labels may be automatically assigned based on metrics and/or other attributes associated with the electronic documents. For instance, a user may assign a sentiment to a Tweet or a sentiment classifier may automatically assign the sentiment based on the like to dislike ratio, retweets, engagement, response patterns, and/or other metrics.

The training process next selects a document from the training corpus (operation 504). The process may select and iterate through the documents in any arbitrary or predetermined order.

The training process includes generating a respective feature vector for the selected document based on (a) a full vocabulary or (b) a reduced vocabulary with an aggregate vector representation for the tokens not present in the reduced vocabulary (operation 506). In some embodiments, the full vocabulary is used when unknown tokens are replaced with nearest neighbors. The ML feature vector may be v long in this case and may not include the out-of-domain aggregate vector representation from the word embedding service. The ML feature vector may be generated according to the process depicted in FIG. 3A. In the latter case where a reduced vocabulary is used, the ML feature vector may be v+m long, and the ML feature vector may be generated according to the process depicted in FIG. 3B.

The training process further includes determining whether there are remaining documents in the training corpus of documents (operation 508). If so, then the process returns to operation 504 and iterates through the remaining documents to generate a respective feature vector for each remaining document.

The training process next trains a ML model to estimate unknown labels for new examples based on patterns in feature vectors and the associated labels in the training corpus (operation 510). For example, the ML model may be trained to estimate a click-through rate, success rate, failure rate, or any other relevant metric or classification based, at least in part, on learned patterns of vocabulary tokens and/or aggregate word vector representations.

Training logic 112 may train one or more ML models using the feature vectors. Example models that may be trained may include, but are not limited to, regression-based models, random forest walkthroughs, artificial neural networks, and support vector machines. The model training may determine what weights, if any, to give to features and/or combinations of features based on patterns learned through the training feature vectors and associated labels.

4.3 Model Predictions

Once trained, a ML model may be used to estimate unknown labels for new examples. In some embodiments, the outcome of a given action may be predicted or a new document classification may be automatically estimated based on the feature values for a new document, even though the specific combination of feature values and corresponding outcome has not been previously observed. As an example, a client may request a prediction of the sentiment of a new Tweet for different audiences. In this case, the new Tweet may include a particular combination of words, images, videos, and/or hyperlinks not previously observed. ML engine 110 may use the trained ML model to predict the sentiment based on the patterns learned from the training corpus of documents.

Figure 6:
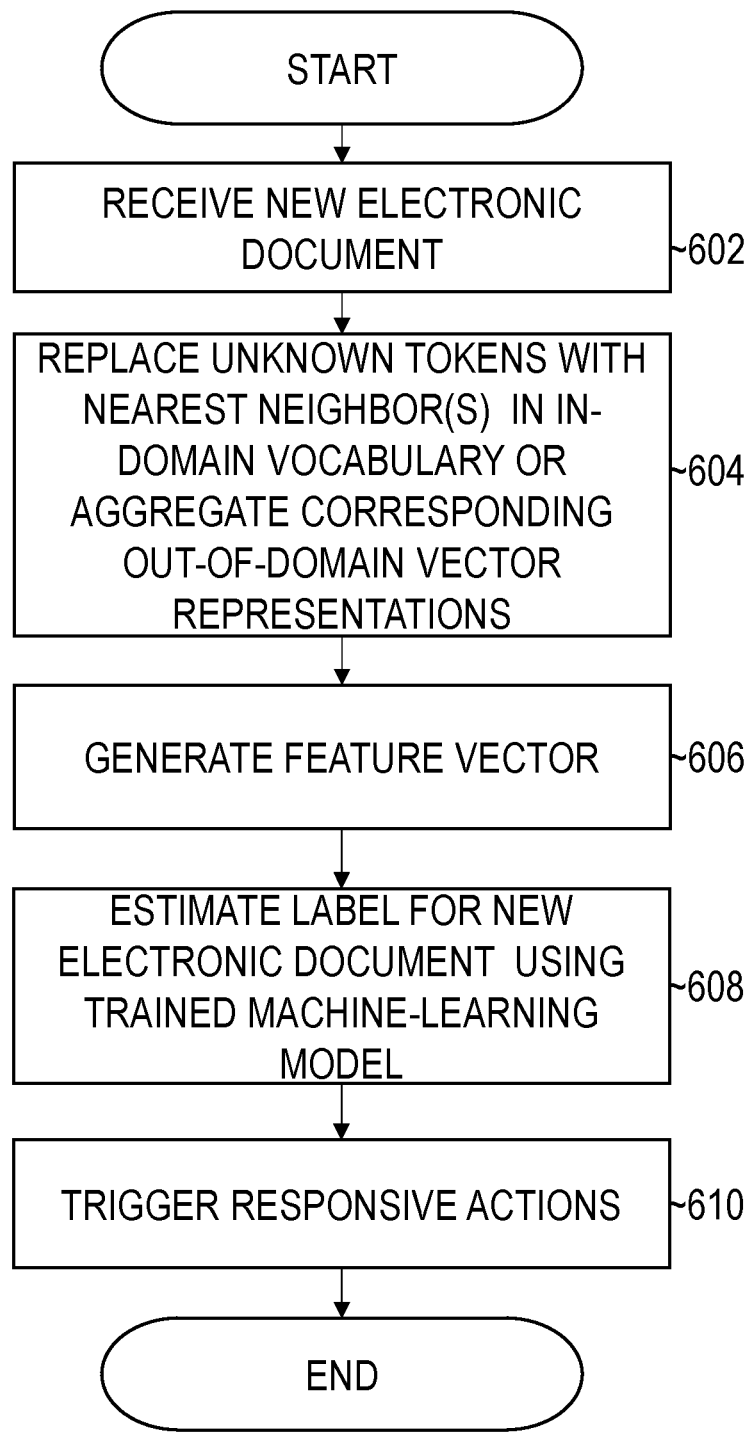
FIG. 6 illustrates an example set of operations for estimating unknown labels for new documents using a trained machine-learning model in accordance with some embodiments.

FIG. 6 illustrates an example set of operations for estimating unknown labels for new examples using a trained machine-learning model in accordance with some embodiments. One or more operations illustrated in FIG. 6 may be modified, rearranged, or omitted. Accordingly, the particular sequence of operations illustrated in FIG. 6 should not be construed as limiting the scope of one or more embodiments.

The estimation process includes receiving a new document for which a label is unknown (operation 602). For example, the new document may be for a potential social media post for which the sentiment among a list of viewers is unknown since it has not yet been posted. As another example, the new document may be a webpage for which a classification is unknown. The ML model may be applied to other types of electronic documents to estimate an unknown label.

The estimation process further replaces unknown tokens with the nearest neighbor in the in-domain vocabulary or aggregates corresponding out-of-domain vector representations (operation 604). The estimation process next generates a feature vector based in part on the replaced tokens or the aggregate vector representations (operation 606). For example, the estimation process may implement the processes depicted in FIG. 3A or 3B to generate the ML vector during these operations.

The estimation process further includes estimating a label for the new example using the trained ML model (operation 608). In some embodiments, ML engine 110 receives, as input, the feature vector for the new document at this operation and applies the trained model to generate the estimated label. For example, the estimated label may be a predicted metric, such as a predicted click-through rate, or an estimated classification. The labels that are estimated may vary depending on the particular implementation.

The process further includes triggering one or more responsive actions (operation 610). The applied ML model may be used to enhance and/or optimize various computing functions, which may vary depending on the particular ML application.

In some embodiments, ML application 104 may be configured to analyze automated social media posts ML application 104 may apply the model to estimate a predicted sentiment of one or more social media post based on patterns in the textual and/or non-textual tokens. ML application 104 may trigger, via action interface 120, a social media post if the estimated sentiment satisfies a threshold. For instance, if the estimated sentiment is positive within a threshold level of confidence, then an automatic responsive Tweet may be sent. If the estimated sentiment is negative or does not satisfy the threshold level of confidence, then ML application 104 may prevent the social media post from being published.

As another example, ML application 104 may select one of a plurality of social media posts to publish based on which social media post has vocabulary patterns that are predicted with the highest confidence to lead to a positive sentiment or which patterns are predicted to lead to the highest click-through rate for an embedded hyperlink.

In yet another example, ML application 104 may flag a webpage for a violation of guidelines based on the textual and/or non-textual tokens on the webpage. Other actions may be triggered through action interface 120. Examples include, but are not limited to, selecting and rendering GUI objects in a webpage, presenting recommendations, patching software resources, and otherwise reconfiguring computing resources.

4.4 Model Tuning

Figure 7:
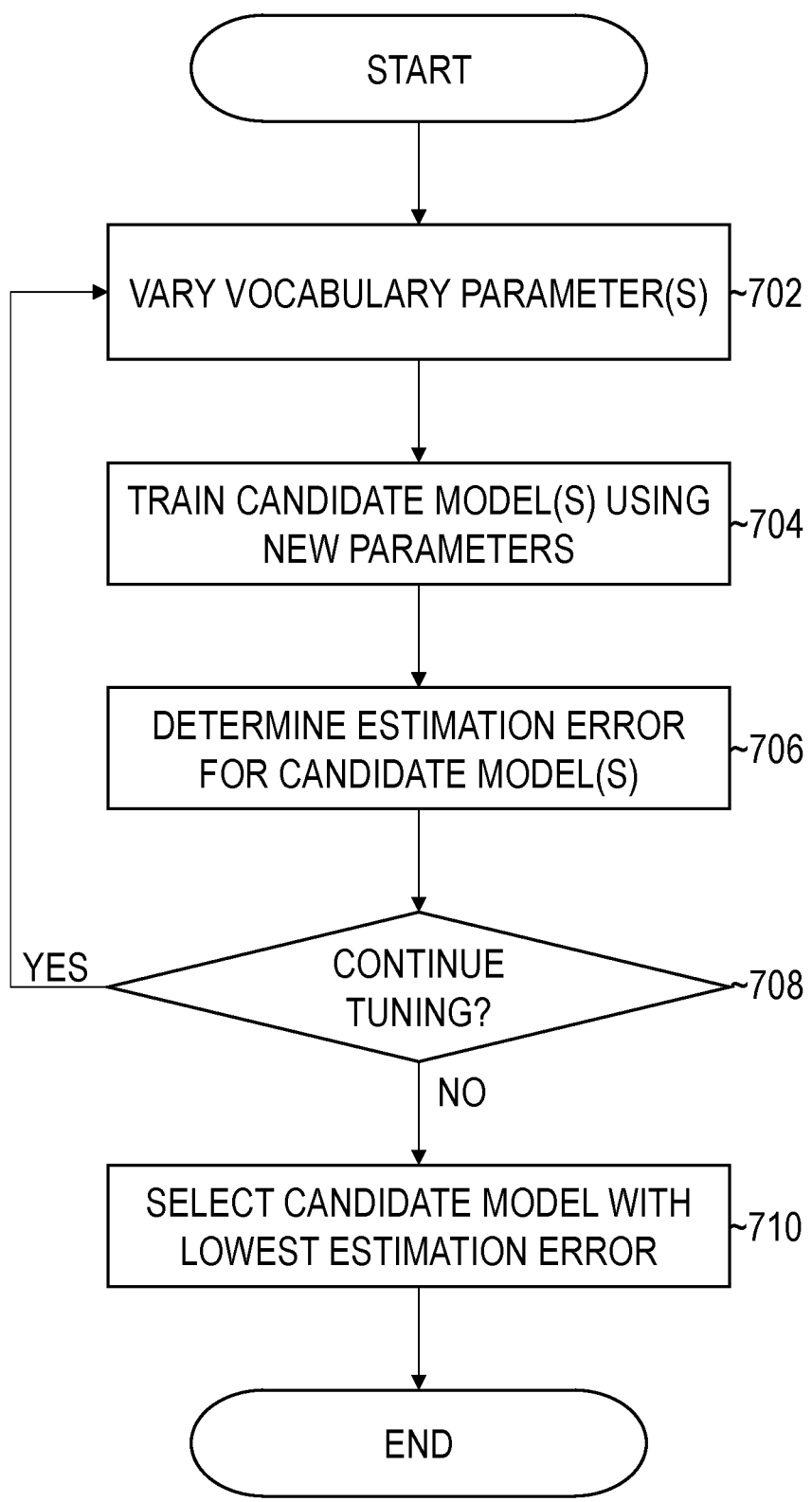
FIG. 7 illustrates an example process for tuning a machine-learning model as a function of estimation error in accordance with some embodiments.

In some embodiments, ML engine 110 may tune the vocabulary parameters to optimize model performance. FIG. 7 illustrates an example process for tuning a ML model as a function of estimation error in accordance with some embodiments. One or more operations illustrated in FIG. 7 may be modified, rearranged, or omitted. Accordingly, the particular sequence of operations illustrated in FIG. 7 should not be construed as limiting the scope of one or more embodiments.

The tuning process includes varying one or more vocabulary parameters (operation 702). In some embodiments, the tokens within a reduced vocabulary may be varied. For example, the number of tokens that are removed may vary up to a predefined threshold. Additionally or alternatively, the tuning process may iterate through different combinations of tokens that are removed to form the reduced vocabularies.

In addition or as an alternative to varying the vocabulary tokens, the vocabulary weights may be varied. In some embodiments, for example, the weights of replacement tokens may be varied in relation to known tokens. In other embodiments, the token weight may be varied as a function of how frequently it occurs within a training corpus.

Additionally or alternatively, the tuning process may switch between how unknown tokens are handled. For example, the tuning process may replace unknown tokens in some cases and form aggregate vector representations in other cases. Thus, the tuning process may test both the document representations obtained through the process depicted in FIG. 3A and the process depicted in FIG. 3B.

The tuning process next trains one or more candidate models using the new set of parameters (operation 704). During this operation, the process may generate a new set of feature vectors for a training corpus of documents. For example, one iteration may train models using a first set of reduced tokens, another using different set of reduced tokens, another using different weightings, etc. In some embodiments, the same set of feature vectors may be used to train different types of models, such as regression-based models and artificial neural networks, to provide further tuning.

The tuning process further includes determining the estimation error for the candidate models (operation 706). To determine the estimation error, the process may generate estimates for a testing dataset. A testing dataset may include examples that were not used to train the candidate models but for which labels are known. The tuning process may generate a prediction for a respective example in the testing dataset using each candidate model that was trained based on the new parameters and compare it to the respective known labels. The estimation error for an example in a testing dataset may be computed as a function of the difference between the estimated label and the known label. The estimation error for the candidate model may be computed as the average of the estimation error across all examples in the testing dataset.

The tuning process next determines whether to continue tuning (operation 708). For example, the tuning process may iterate through various combinations of vocabularies and/or vocabulary weights. Additionally or alternatively an estimation error threshold may be set where tuning may stop if the estimation error for one or more of the candidate models is below a threshold.

The tuning process next selects the candidate model with the lowest estimation error (operation 710). The selected model may then be used to evaluate new documents according to the new vocabulary parameters. For example, if replacing unknown tokens was determined to yield the lowest estimation error, then the process may proceed accordingly with token replacement as new documents are received. As another example, the vocabulary weights used for generating the feature vectors may also be updated based on the tuning process. In this manner a more accurate ML model may be generated.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates computer system 800 upon which some embodiments may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause:
    generating a respective feature vector for each respective document in a training dataset of documents, wherein the respective feature vector is generated based at least in part on occurrence, in the respective document, for each respective token in a vocabulary;
    training a machine learning model to estimate unknown labels for documents based at least in part on the feature vector for each respective document in the training dataset;
    receiving a new document with an unknown label;
    identifying a first set of one or more known tokens and a second set of one or more unknown tokens within the new document;
    mapping each respective unknown token in the second set of one or more unknown tokens to one or more known tokens in the vocabulary, wherein an unknown token in the set of one or more unknown tokens is mapped to a known token based at least in part on a computed similarity between the unknown token and the known token;
    generating a feature vector for the new document based at least in part on an occurrence metric for a particular known token in the vocabulary, wherein the occurrence metric for the particular known token is determined based at least in part on how many times the particular known token occurs in both (a) the first set of one or more known tokens and (b) the one or more known tokens in the vocabulary that represent each respective unknown token in the second set of one or more unknown tokens; and
    estimating, by the trained machine learning model, the unknown label for the new documents based at least in part on the feature vector for the new document.

2. The one or more non-transitory computer-readable media of claim 1, wherein mapping each respective unknown token in the second set of one or more unknown tokens to one or more known tokens in the vocabulary comprises determining a first vector representation for the unknown token; and identifying a second vector representation for the known token that is closest to the first vector representation.

3. The one or more non-transitory computer-readable media of claim 2, wherein determining which vector representation is closest to the first vector representation is based on characteristics determined from documents outside of a domain associated with the training dataset of documents.

4. The one or more non-transitory computer-readable media of claim 2, wherein determining which vector representation is closest is based on one of a Euclidean distance or a cosine similarity.

5. The one or more non-transitory computer-readable media of claim 1, wherein the mapping is performed based at least in part on linguistic context determined based at least in part on out-of-domain characteristics associated with the second set of one or more unknown tokens.

6. The one or more non-transitory computer-readable media of claim 1, wherein the second set of one or more unknown tokens includes words that were not present in the training dataset of documents.

7. The one or more non-transitory computer-readable media of claim 1, wherein each respective token in the vocabulary is associated with a weight that is inversely related to the frequency of the respective token in the training dataset of documents.

8. The one or more non-transitory computer-readable media of claim 1, wherein the feature vector for the new document is equal in length to the number of tokens in the vocabulary.

9. The one or more non-transitory computer-readable media of claim 1 wherein the instructions further cause triggering an automated social media post if the unknown label satisfies a set of criteria associated with the social media post.

10. The one or more non-transitory computer-readable media of claim 1, wherein the instructions further cause:
    training a plurality of models using different vocabulary parameters;
    determining estimation errors for each model in the plurality of models; and
    selecting vocabulary parameters based at least in part on which model of the plurality of models has a lowest estimation error.

11. A system comprising:
    one or more hardware processors;
    one or more non-transitory computer-readable media storing instructions, which when executed by the one or more hardware processors, cause:
    generating a respective feature vector for each respective document in a training dataset of documents, wherein the respective feature vector is generated based at least in part on how frequently each respective token in a vocabulary occurs in the respective document and a vector representation for each respective token;
    training a machine learning model to estimate unknown labels for documents based at least in part on the feature vector for each respective document in the training dataset;
    receiving a new document with an unknown label;
    identifying a set of tokens within the new document;
    mapping unknown tokens in the set of tokens to a respective vector representation;
    generating a feature vector for the new document based at least in part on the respective vector representation for the unknown tokens in the set of tokens and how often tokens in the vocabulary occur in the set of tokens, wherein the feature vector for the new document includes at least (a) a first part that is generated as a function of the respective vector representation for the unknown tokens and (b) a second part that is generated as a function of how often tokens in the vocabulary occur in the set of tokens; and estimating, by the trained machine learning model, the unknown label for the new documents based at least in part on the feature vector for the new document.

12. The system of claim 11, wherein mapping unknown tokens in the set of tokens to a respective vector representation comprises:
    determining a respective word vector for each unknown token in the set of tokens; and
    aggregating the respective word vectors for unknown tokens in the set of tokens.

13. The system of claim 12, wherein aggregating the respective word vector comprises averaging the word vectors.

14. The system of claim 12, wherein the respective word vector for each unknown token is determined, based at least in part, on a linguistic context learned from a different corpus of documents than the training dataset of documents.

15. The system of claim 11, wherein the vocabulary is a reduced vocabulary that is generated by removing at least one token from a full vocabulary of tokens extracted from the training dataset.

16. The system of claim 11, wherein generating the feature vector for the new document comprises concatenating the vector representation with a second vector that is generated based at least in part on an occurrence metric of each respective token in the vocabulary.

17. The system of claim 11, wherein each respective token in the vocabulary is associated with a weight that is inversely related to the frequency of the respective token in the training dataset of tokens.

18. The system of claim 11, wherein the instructions further cause triggering an automated social media post if the unknown label satisfies a set of criteria associated with the social media post.

19. The system of claim 11, wherein the instructions further cause:
    training a plurality of models using different combinations of tokens in the reduced vocabulary;
    determining estimation errors for each model in the plurality of models; and
    selecting a reduced vocabulary based at least in part on which model of the plurality of models has a lowest estimation error.

20. A system comprising:
one or more hardware processors;
one or more non-transitory computer-readable media storing instructions, which when executed by the one or more hardware processors, cause:
    generating a respective feature vector for each respective document in a training dataset of documents, wherein the respective feature vector is generated based at least in part on occurrence, in the respective document, for each respective token in a vocabulary;
    training a machine learning model to estimate unknown labels for documents based at least in part on the feature vector for each respective document in the training dataset;
    receiving a new document with an unknown label;
    identifying a first set of one or more known tokens and a second set of one or more unknown tokens within the new document;
    mapping each respective unknown token in the second set of one or more unknown tokens to one or more known tokens in the vocabulary, wherein an unknown token in the set of one or more unknown tokens is mapped to a known token based at least in part on a computed similarity between the unknown token and the known token;
    generating a feature vector for the new document based at least in part on an occurrence metric for a particular known token in the vocabulary, wherein the occurrence metric for the particular known token is determined based at least in part on how many times the particular known token occurs in both (a) the first set of one or more known tokens and (b) the one or more known tokens in the vocabulary that represent each respective unknown token in the second set of one or more unknown tokens; and
    estimating, by the trained machine learning model, the unknown label for the new documents based at least in part on the feature vector for the new document.

* * * * *

UNITED STATES PATENT AND TRADEMARK OFFICE
CERTIFICATE OF CORRECTION

PATENT NO. : 11,507,747 B2
APPLICATION NO. : 16/698857
DATED : November 22, 2022
INVENTOR(S) : Sudhakar Kalluri It is certified that error appears in the above-identified patent and that said Letters Patent is hereby corrected as shown below:

In the Drawings

On sheet 6 of 9, in FIG. 5, under Reference Numeral 510, Line 2, delete "UNKOWN" and insert -- UNKNOWN --, therefor.

In the Specification

In Column 18, Line 23, delete "neighbor" and insert -- neighbor(s) --, therefor.

Signed and Sealed this
Fifteenth Day of August, 2023

Katherine Kelly Vidal
*Director of the United States Patent and Trademark Office*